E. ROBERTS.
MACHINE FOR PREDIGESTING AND STERILIZING STOCK FOODS.
APPLICATION FILED JUNE 24, 1915.
1,170,191.
Patented Feb. 1, 1916.
2 SHEETS—SHEET 1.
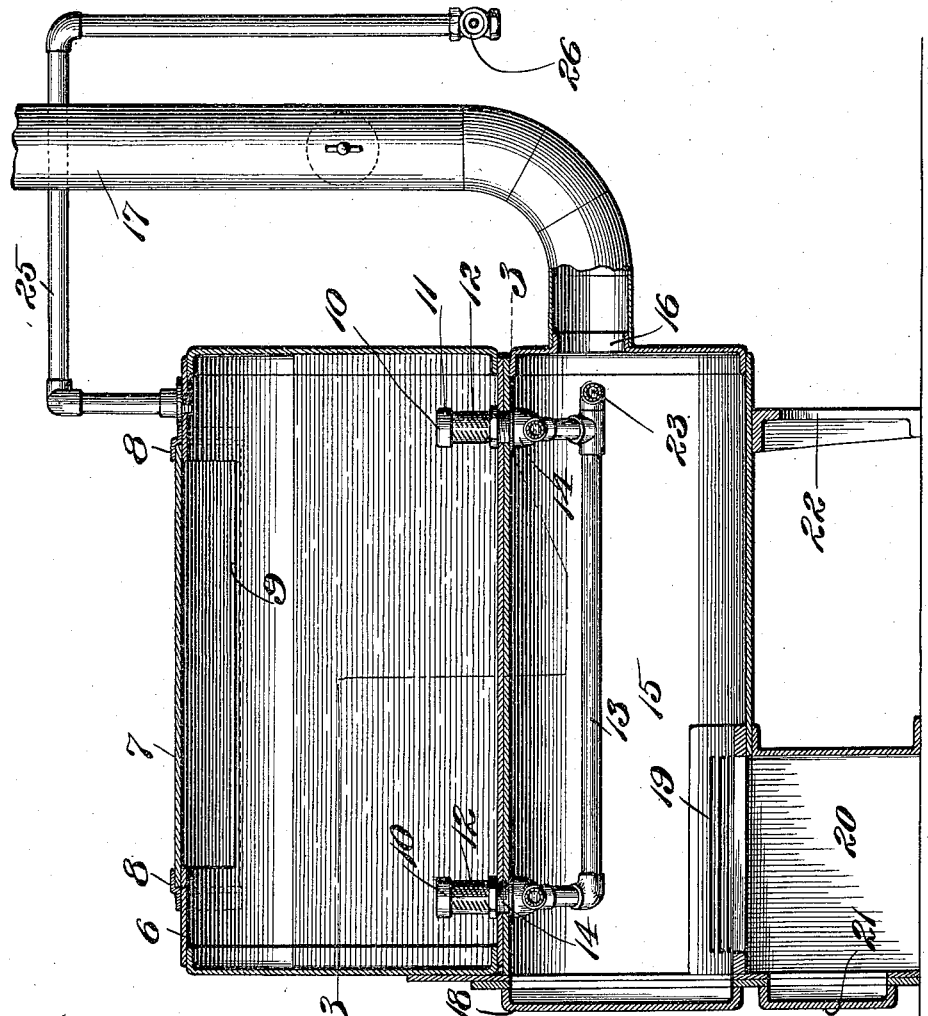
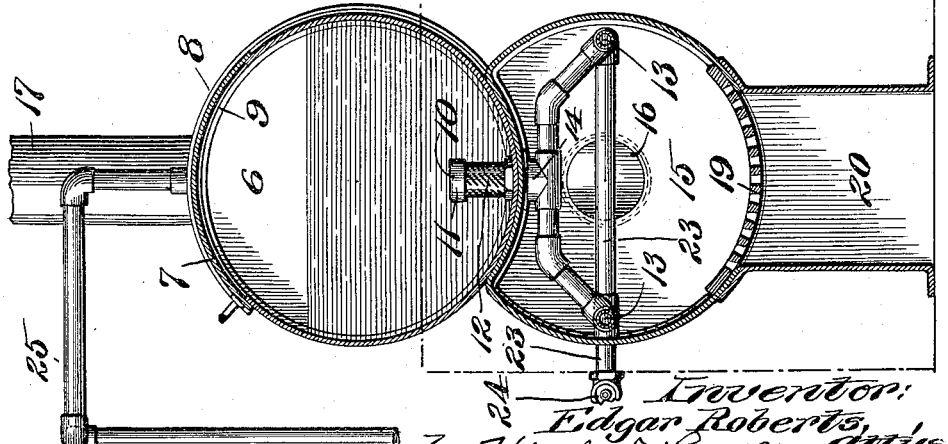

E. ROBERTS.
MACHINE FOR PREDIGESTING AND STERILIZING STOCK FOODS.
APPLICATION FILED JUNE 24, 1915.
1,170,191.
Patented Feb. 1, 1916.
2 SHEETS—SHEET 2.
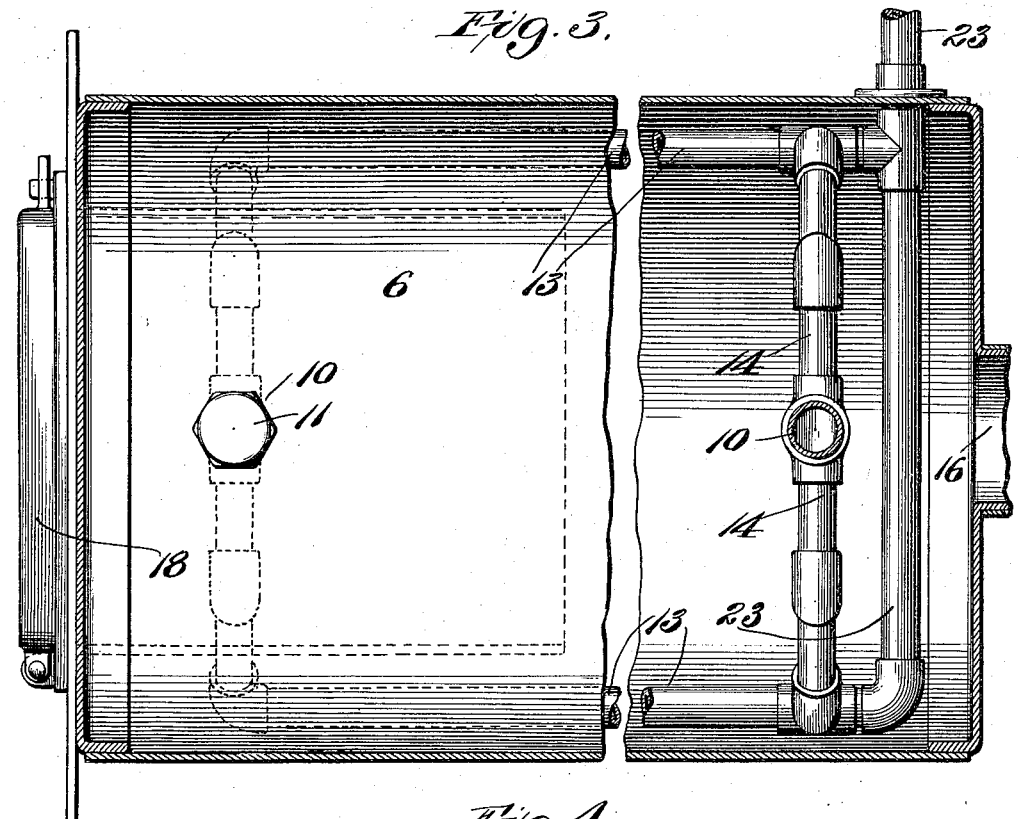
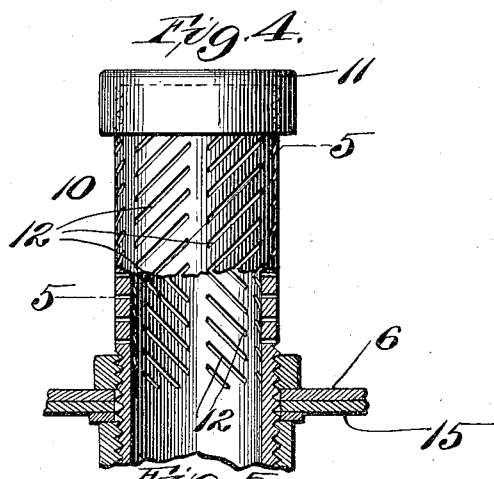
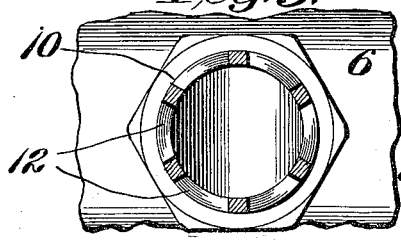

UNITED STATES PATENT OFFICE.

EDGAR ROBERTS, OF ST. LOUIS, MISSOURI, ASSIGNOR, BY DIRECT AND MESNE ASSIGNMENTS, TO LANDRO MANUFACTURING COMPANY, OF ST. LOUIS, MISSOURI, A CORPORATION OF MISSOURI.

MACHINE FOR PREDIGESTING AND STERILIZING STOCK FOODS.

1,170,191.   Specification of Letters Patent.   Patented Feb. 1, 1916.

Application filed June 24, 1915. Serial No. 35,989.

*To all whom it may concern:*

Be it known that I, EDGAR ROBERTS, a citizen of the United States, and resident of St. Louis, Missouri, have invented certain new and useful Improvements in Machines for Predigesting and Sterilizing Stock Foods, of which the following is a specification containing a full, clear, and exact description, reference being had to the accompanying drawings, forming a part hereof.

My invention relates to an improved machine for predigesting and sterilizing stock foods, and consists in the novel construction hereinafter described and specifically designated in the appended claims.

The object of my invention is to predigest, sterilize and increase the nutritive value of starch food products, such as corn, wheat, oats, barley, potatoes, beets, turnips, Kafir corn and all starchy foods, whereby the same will not only be thoroughly cooked and sterilized, but will be partly digested. The long continued heat to which the food is subjected softens the material and turns the starch to sugar, ready for assimilation, and also increases the nutritive value of the product.

In the drawings: Figure 1 is a vertical end section of a machine embodying my invention; Fig. 2 is a vertical side elevation, partly in section; Fig. 3 is a horizontal section taken on the line 3—3 of Fig. 2; Fig. 4 is a detail section of one of my improved rosette mixing nozzles used at the base of the digesting chamber; and Fig. 5 is a detail cross section taken on the line 5—5 of Fig. 4.

Referring by numerals to the accompanying drawings: 6 indicates a digesting chamber, which in the present instance is in the form of a horizontal sheet metal cylinder having in its upper portion a door 7 which is mounted in guides 8 to slide back and forth over an opening 9, through which latter the raw material is inserted and the partially digested product is to be removed. Located in the bottom of the said digesting chamber 6 are a number of rosette mixing nozzles 10, which project from the bottom of said chamber upwardly upon the interior thereof and have their upper ends closed by a cap 11. The vertical wall of said nozzles is perforated by a series of oblique slots 12. Steam is supplied to the said nozzles 10 in the present instance by a series of water tubes 13, which are connected to the lower ends of said nozzles by means of common tubular connections 14. The said water tubes 13 and their connections form a very effective heating surface, the same being located in a fire box 15 which is placed beneath the said digesting chamber 6 and is provided at one end with the usual smoke pipe collar 16 and chimney 17. At the front end of said fire box 15 is the usual hinged fire door 18, by opening which the fire grate 19 may be supplied with suitable fuel. Beneath the grate is the usual ash pan 20, provided with the door 21. The rear end of the fire box 15 is supported by suitable legs 22. 23 indicates a drain pipe connected to said horizontal pipes 13 and projecting on the exterior of said fire box where it is provided with a common valve 24. 25 indicates a steam pipe which is connected to the top of said digesting chamber 6 and provided with a common valve 26.

The operation is as follows: The raw material, such as corn, wheat, oats, barley, or other starchy food is placed in the digesting chamber, together with about fifty per cent. of water, and then the heat is applied, in the present instance by building a fire in said fire box 15. The water tubes 13 and their connections will generate steam, which will be discharged through the oblique slots 12 of said nozzles 10 in a lateral direction, and will agitate and mix thoroughly the material in the said digesting chamber and cause the same to be thoroughly circulated in said chamber. I have found in actual practice that when the said tubes 13 are very hot, the steam will be ejected in "puffs" from the said nozzles, after each of which the water will enter the slots of said nozzles and pass into the said tubes, when the same operation will be repeated. The puffs of steam issuing laterally from said nozzles has the above described effect of thoroughly mixing and circulating the material in the said digesting chamber, and the said material, after being subjected to steam in said closed chamber in the manner above described, for a period of several hours will be thereby softened and enlarged to several times its normal volume, and the starch will be turned to sugar and the nutritive value of the food will be increased to great extent. The product may be removed from the said chamber 6 by allowing the machine to cool off and then opening the door 7. After the predigested and sterilized product has been removed from the said chamber 6 the remaining fluid which is very rich in oils, valuable as a food product, is drawn off through the said pipe 23 by opening the said valve 24. The steam pipe 25 may be used for sterilizing milk cans and other receptacles, and for warming water, etc.

Having thus described my invention, what I claim as new therein and desire to secure by Letters Patent of the United States, is:

1. A machine for predigesting and sterilizing foods, comprising a suitable closed chamber, fixed, vertical nozzles having a series of slots arranged to discharge laterally in said chamber near the bottom thereof, and suitable means for supplying steam under pressure to said nozzles.

2. A machine for predigesting and sterilizing foods, comprising a suitable closed chamber, nozzles having oblique slots arranged to discharge laterally in said chamber near the bottom thereof, and means for supplying to said nozzles steam under pressure.

3. A machine for predigesting and sterilizing foods, comprising a digesting chamber having a suitable supply and discharge opening, a door for closing said opening, a series of rosette nozzles located in said chamber and provided with oblique slots, a series of water tubes below said chamber and connected to said nozzles, a fire box inclosing said water tubes, a steam pipe connected with the upper part of said chamber to discharge steam therefrom, and a valved pipe connected to said water tubes for drawing off the liquid from said chamber.

In testimony whereof, I have signed my name to this specification, in presence of two subscribing witnesses.

EDGAR ROBERTS.

Witnesses:
E. L. WALLACE,
E. E. LONGAN.

Copies of this patent may be obtained for five cents each, by addressing the "Commissioner of Patents, Washington, D. C."